United States Patent
Kotreka et al.

(10) Patent No.: US 10,057,880 B2
(45) Date of Patent: Aug. 21, 2018

(54) SMART NOTIFICATIONS BETWEEN DEVICES

(71) Applicant: QUALCOMM Incorporated, San Diego, CA (US)

(72) Inventors: Ravi Kanth Kotreka, Hyderabad (IN); Harinath Reddy Patel, Mahabubnagar (IN); Pankaj Bansal, Jaipur (IN); Mahender Reddy Akkapally, Chelmeda (IN); Praveen Peruru, Hyderabad (IN); Karthikeyan Sabapathi, Hyderabad (IN); Abhijeet Sinha, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/375,138

(22) Filed: Dec. 11, 2016

(65) Prior Publication Data
US 2018/0167908 A1 Jun. 14, 2018

(51) Int. Cl.
*H04W 68/02* (2009.01)
*H04W 4/14* (2009.01)
*H04W 4/02* (2018.01)

(52) U.S. Cl.
CPC ............ *H04W 68/02* (2013.01); *H04W 4/02* (2013.01); *H04W 4/14* (2013.01)

(58) Field of Classification Search
CPC .......... H04W 68/02; H04W 4/02; H04W 4/14
See application file for complete search history.

(56) References Cited

U.S. PATENT DOCUMENTS

| 6,690,778 | B2 * | 2/2004 | Kahn ...................... H04M 1/82 379/102.02 |
| 8,704,866 | B2 * | 4/2014 | Igoe ................... H04L 12/2809 348/14.04 |
| 9,626,543 | B1 * | 4/2017 | Ray ...................... G06K 7/1413 |
| 2007/0226311 | A1 * | 9/2007 | Kaarela ............... H04L 12/2827 709/217 |
| 2009/0197524 | A1 | 8/2009 | Haff et al. |
| 2013/0316744 | A1 * | 11/2013 | Newham ............... H04M 19/04 455/458 |

(Continued)

FOREIGN PATENT DOCUMENTS

CN 103108232 A 5/2013

OTHER PUBLICATIONS

International Search Report and Written Opinion—PCT/US2017/060820—ISA/EPO—Jan. 30, 2018.

*Primary Examiner* — Mehmood B. Khan
(74) *Attorney, Agent, or Firm* — Muncy, Geissler, Olds & Lowe, P.C.

(57) ABSTRACT

Disclosed are methods and apparatuses for providing notifications in a communication network of a plurality of Internet of Things (IoT) devices. In an aspect, a supervisor device in the communication network detects a notification directed to a wireless mobile device in the communication network and sends at least one instruction to at least a first IoT device of the plurality of IoT devices to reduce an operating volume or suspend operation of the first IoT device. The first IoT device receives the at least one instruction from the supervisor device and reduces the operating volume of the IoT device or suspends the operation of the IoT device in response to the at least one instruction.

48 Claims, 5 Drawing Sheets

(56) References Cited

U.S. PATENT DOCUMENTS

| | | | |
|---|---|---|---|
| 2013/0316746 A1* | 11/2013 | Miller | H04L 51/30 455/466 |
| 2014/0244834 A1* | 8/2014 | Guedalia | H04L 67/16 709/224 |
| 2015/0006296 A1* | 1/2015 | Gupta | G06Q 30/0269 705/14.66 |
| 2015/0045092 A1* | 2/2015 | Wang | H04M 1/6066 455/556.1 |
| 2015/0134761 A1* | 5/2015 | Sharma | H04L 67/26 709/207 |
| 2015/0199610 A1* | 7/2015 | Hershberg | H04W 4/70 706/12 |
| 2015/0201035 A1* | 7/2015 | Profit | H04L 67/2842 709/213 |
| 2016/0041534 A1* | 2/2016 | Gupta | G05B 13/0265 700/275 |
| 2016/0044151 A1 | 2/2016 | Shoemaker et al. | |
| 2016/0100379 A1 | 4/2016 | Nguyen et al. | |
| 2016/0134737 A1* | 5/2016 | Pulletikurty | G06F 3/0227 715/735 |
| 2016/0323156 A1* | 11/2016 | Zakaria | H04L 43/04 |
| 2016/0334800 A1* | 11/2016 | Han | G05D 1/0274 |
| 2016/0353305 A1* | 12/2016 | Zakaria | H04W 24/10 |
| 2017/0171607 A1* | 6/2017 | Britt | H04N 21/43615 |
| 2017/0223130 A1* | 8/2017 | Profit | H04L 67/28 |

* cited by examiner

SMART NOTIFICATIONS BETWEEN DEVICES

TECHNICAL FIELD

The various aspects described herein generally relate to smart notifications between devices.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

As such, in the near future, increasing development in IoT technologies will lead to numerous IoT devices surrounding a user at home, in vehicles, at work, and many other locations.

SUMMARY

The following presents a simplified summary relating to one or more aspects disclosed herein. As such, the following summary should not be considered an extensive overview relating to all contemplated aspects of the disclosure, nor should the following summary be regarded to identify key or critical elements relating to all contemplated aspects or to delineate the scope associated with any particular aspect. Accordingly, the following summary has the sole purpose to present certain concepts relating to one or more aspects of the disclosure relating to the mechanisms disclosed herein in a simplified form to precede the detailed description presented below.

In an aspect, a method of providing notifications in a communication network of a plurality of Internet of Things (IoT) devices includes detecting, at a supervisor device in the communication network, a notification directed to a wireless mobile device in the communication network, and sending, by the supervisor device, at least one instruction to at least a first IoT device of the plurality of IoT devices to reduce an operating volume or suspend operation of the first IoT device.

In an aspect, a method of receiving notifications in a communication network of a plurality of IoT devices includes receiving, at an IoT device of the plurality of IoT devices, at least one instruction from a supervisor device in the communication network to reduce an operating volume or suspend operation of the IoT device based on detection of a notification directed to a wireless mobile device in the communication network, and reducing, by the IoT device, the operating volume of the IoT device or suspending, by the IoT device, the operation of the IoT device in response to the at least one instruction.

In an aspect, an apparatus for providing notifications in a communication network of a plurality of IoT devices includes a transceiver of a supervisor device, and at least one processor of the supervisor device configured to cause the transceiver to: detect a notification directed to a wireless mobile device in the communication network, and send at least one instruction to at least a first IoT device of the plurality of IoT devices to reduce an operating volume or suspend operation of the first IoT device.

In an aspect, an apparatus for receiving notifications in a communication network of a plurality of IoT devices includes a transceiver of an IoT device of the plurality of IoT devices configured to receive at least one instruction from a supervisor device in the communication network to reduce an operating volume or suspend operation of the IoT device based on detection of a notification directed to a wireless mobile device in the communication network, and at least one processor of the IoT device configured to reduce the operating volume of the IoT device or suspend the operation of the IoT device in response to the at least one instruction.

In an aspect, an apparatus for providing notifications in a communication network of a plurality of IoT devices includes means for detecting, at a supervisor device in the communication network, a notification directed to a wireless mobile device in the communication network, and means for sending, by the supervisor device, at least one instruction to at least a first IoT device of the plurality of IoT devices to reduce an operating volume or suspend operation of the first IoT device.

In an aspect, an apparatus for receiving notifications in a communication network of a plurality of IoT devices includes means for receiving, at an IoT device of the plurality of IoT devices, at least one instruction from a supervisor device in the communication network to reduce an operating volume or suspend operation of the IoT device based on detection of a notification directed to a wireless mobile device in the communication network, and means for reducing, by the IoT device, the operating volume of the IoT device or for suspending, by the IoT device, the operation of the IoT device in response to the at least one instruction.

In an aspect, a non-transitory computer-readable medium for providing notifications in a communication network of a plurality of IoT devices includes at least one instruction to cause a supervisor device in the communication network to detect a notification directed to a wireless mobile device in the communication network, and at least one instruction to cause the supervisor device to send at least one instruction to at least a first IoT device of the plurality of IoT devices to reduce an operating volume or suspend operation of the first IoT device.

In an aspect, a non-transitory computer-readable medium for receiving notifications in a communication network of a plurality of IoT devices includes at least one instruction to cause an IoT device of the plurality of IoT devices to receive at least one instruction from a supervisor device in the communication network to reduce an operating volume or suspend operation of the IoT device based on detection of a notification directed to a wireless mobile device in the communication network, and at least one instruction to cause the IoT device to reduce the operating volume of the IoT device or suspend the operation of the IoT device in response to the at least one instruction.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Disclosed are methods and apparatuses for providing notifications in a communication network of a plurality of Internet of Things (IoT) devices. In an aspect, a supervisor device in the communication network detects a notification directed to a wireless mobile device in the communication network and sends at least one instruction to at least a first IoT device of the plurality of IoT devices to reduce an operating volume or suspend operation of the first IoT device. The first IoT device receives the at least one instruction from the supervisor device and reduces the operating volume of the IoT device or suspends the operation of the IoT device in response to the at least one instruction.

These and other aspects are disclosed in the following description and related drawings to show specific examples relating to exemplary aspects of the disclosure. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects of the disclosure include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth® identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, a near-field communication (NFC) tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, application-specific integrated circuit (ASIC), or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

Figure 1:
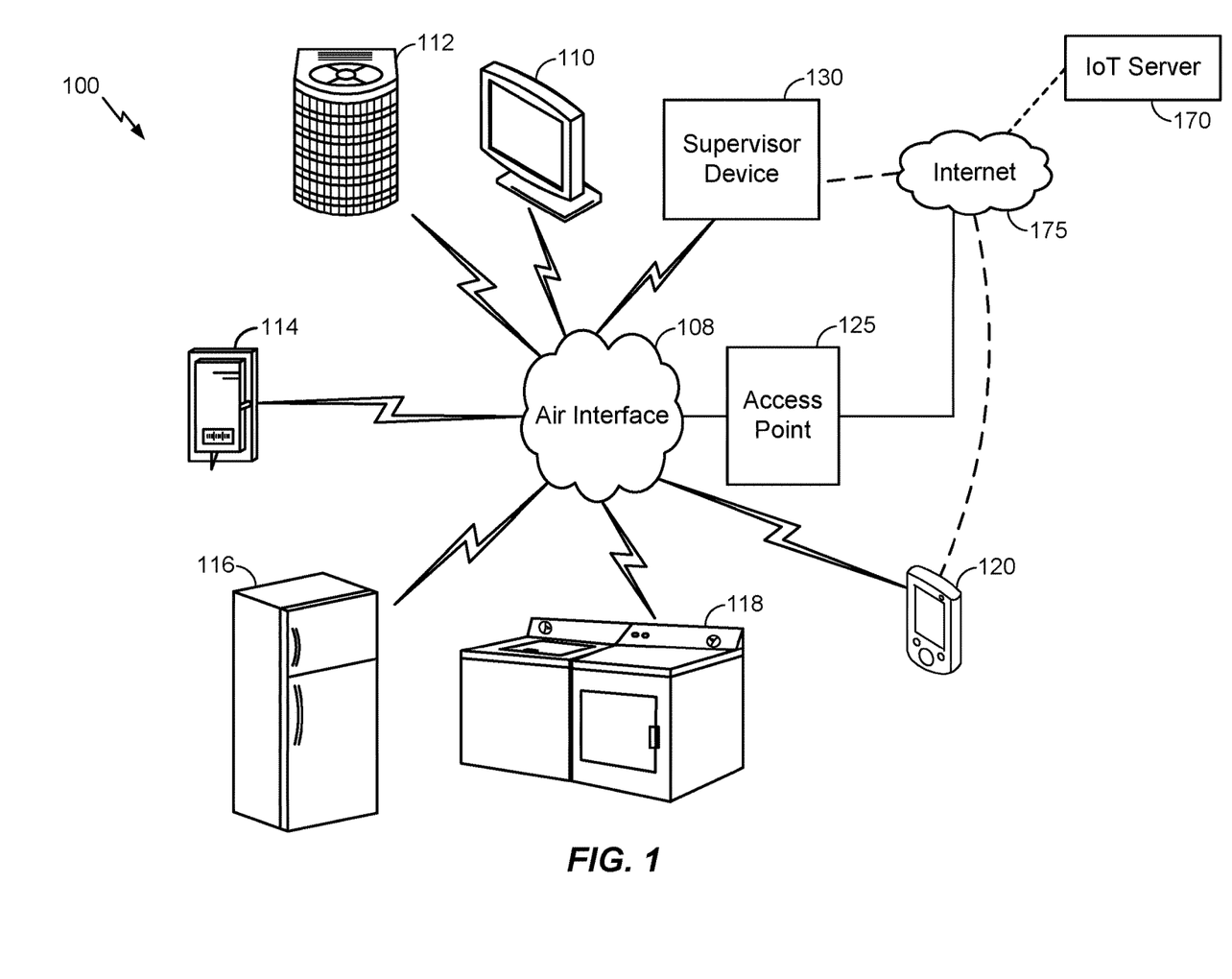
FIG. 1 illustrates an exemplary high-level system architectures of a wireless communications system that includes various Internet of Things (IoT) devices.

FIG. 1 illustrates a high-level system architecture of a wireless communications system 100 in accordance with various aspects of the disclosure. The wireless communications system 100 contains a plurality of IoT devices, which include a television 110, an outdoor air conditioning unit 112, a thermostat 114, a refrigerator 116, and a washer and dryer 118. IoT devices 110-118 are configured to communicate with an access network (e.g., an access point 125) over a physical communications interface or layer, shown in FIG. 1 as air interface 108. The air interface 108 may comply with a wireless Internet protocol (IP), such as IEEE 802.11. Although FIG. 1 illustrates IoT devices 110-118 communicating over the air interface 108, each IoT device may communicate over a wired or wireless connection, or both. In addition, there may be more, fewer, or different devices than the illustrated IoT devices in the wireless communications system 100.

The Internet 175 includes a number of routing agents and processing agents (not shown in FIG. 1 for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1, a wireless mobile device 120 (also an IoT device), such as a smartphone or tablet computer, is shown as connecting to the Internet 175 via the air interface 108 or a cellular network (shown as a dashed line). The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1, an IoT server 170 is shown as connected to the Internet 175. The IoT server 170 can be implemented as a plurality of structurally separate servers, or alternately may correspond to a single server. In various aspects, the IoT server 170 may be optional, and the group of IoT devices 110-120 may be a peer-to-peer (P2P) network. In such a case, the IoT devices 110-120 can communicate with each other directly over the air interface 108 using appropriate device-to-device (D2D) communication technology. Alternatively, or additionally, some or all of the IoT devices 110-120 may be configured with a communication interface independent of the air interface 108. For example, if the air interface 108 corresponds to a Wi-Fi interface, one or more of the IoT devices 110-120 may have Bluetooth® or NFC interfaces for communicating directly with each other or other Bluetooth® or NFC-enabled devices.

The wireless communications system 100 may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In various aspects, the supervisor device 130 may generally observe, monitor, control, or otherwise manage the various other components in the wireless communications system 100. For example, the supervisor device 130 can communicate with an access network (e.g., access point 125) over air interface 108 to monitor or manage attributes, activities, or other states associated with the various IoT devices 110-120 in the wireless communications system 100. The supervisor device 130 may have a wireless connection to the Internet 175 and via the Internet 175 to the IoT server 170. The connection to the Internet 175 and/or the IoT server 170 may be over the access point 125 or a cellular network (shown as a dotted line between the supervisor device 130 and the Internet 175). The supervisor device 130 may obtain information from the Internet 175 and/or the IoT server 170 that can be used to further monitor or manage attributes, activities, or other states associated with the various IoT devices 110-120.

The supervisor device 130 may be a standalone device or one of IoT devices 110-120, such as wireless mobile device 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100.

Figure 2:
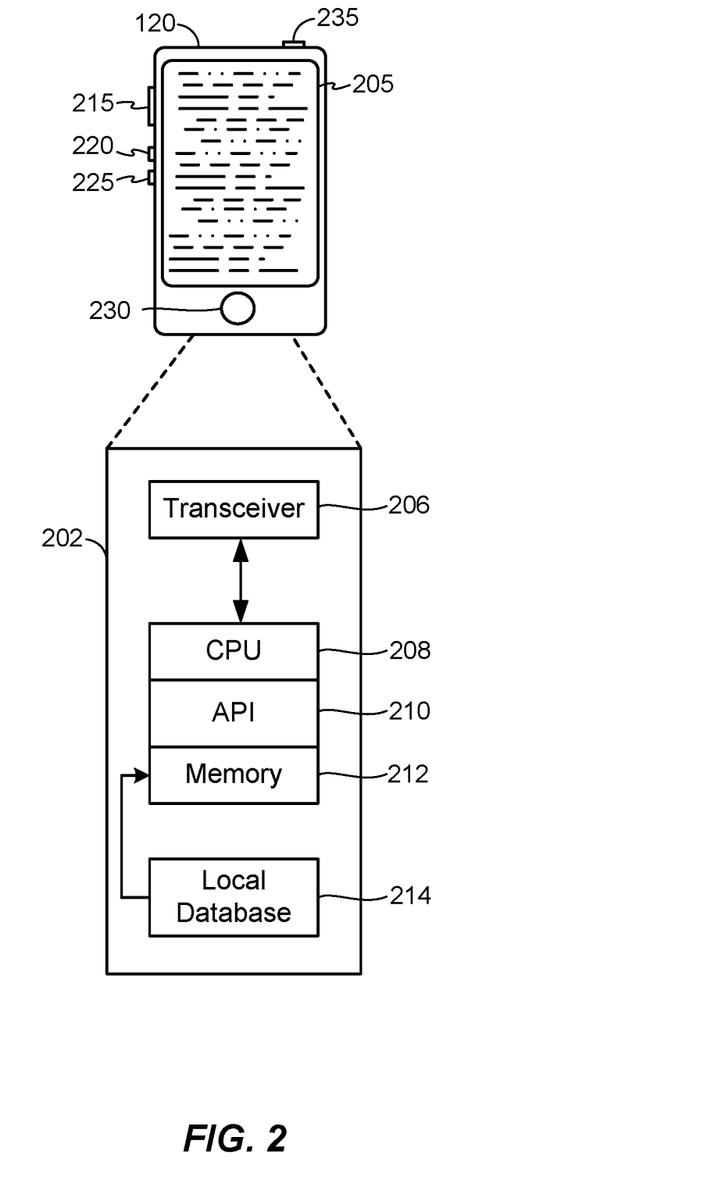
FIG. 2 illustrates an example of a wireless mobile device in accordance with aspects of the disclosure.

FIG. 2 illustrates an example of the wireless mobile device 120 in accordance with aspects of the disclosure. Referring to FIG. 2, wireless mobile device 120 is illustrated as a touchscreen device (e.g., a smart phone, a tablet computer, etc.). As shown in FIG. 2, an external casing of wireless mobile device 120 is configured with a touchscreen display 205, peripheral buttons 215, 220, 225, and 235 (e.g., a power control button, a volume or vibrate control button, an airplane mode toggle button, etc.), and at least one front-panel button 230 (e.g., a "Home" button, etc.), among other components, as is known in the art. While not shown explicitly as part of wireless mobile device 120, wireless mobile device 120 can include one or more external antennas and/or one or more integrated antennas that are built into the external casing of wireless mobile device 120, including but not limited to WiFi antennas, cellular antennas, satellite position system (SPS) antennas (e.g., global positioning system (GPS) antennas), and so on.

While internal components of wireless mobile device 120 can be embodied with different hardware configurations, a basic high-level configuration for internal hardware components is shown as platform 202 in FIG. 2. The platform 202 can receive and execute software applications, data and/or commands transmitted from the Internet 175 and/or other remote servers and networks (e.g., IoT server 170, web URLs, etc.). The platform 202 can also independently execute locally stored applications without network interaction. The platform 202 can include a transceiver 206 operably coupled to a central processing unit (CPU) 208, or other processor, microprocessor, logic circuit, or other data processing device. The CPU 208 or other processor executes the application programming interface (API) 210 layer that interfaces with any resident programs in a memory 212 of the wireless mobile device. The memory 212 can be comprised of read-only or random-access memory (ROM and RAM), electrically-erasable programmable ROM (EEPROM), flash cards, or any memory common to computer platforms. The platform 202 also can include a local database 214 that can store applications not actively used in the memory 212, as well as other data. The local database 214 is typically a flash memory cell, but can be any secondary storage device as known in the art, such as magnetic media, EEPROM, optical media, tape, soft or hard disk, or the like.

Accordingly, an aspect of the disclosure can include a wireless mobile device (e.g., wireless mobile device 120) including the ability to perform functions described herein. As will be appreciated by those skilled in the art, the various logic elements can be embodied in discrete elements, software modules executed on a processor or any combination of software and hardware to achieve the functionality disclosed herein. For example, the CPU 208, the memory 212, the API 210, and the local database 214 may all be used cooperatively to load, store, and execute various functions disclosed herein and thus the logic to perform these functions may be distributed over various elements. Alternatively, the functionality could be incorporated into one discrete component. Therefore, the features of the wireless mobile device 120 in FIG. 2 are to be considered merely illustrative and the disclosure is not limited to the illustrated features or arrangement.

Figure 3:
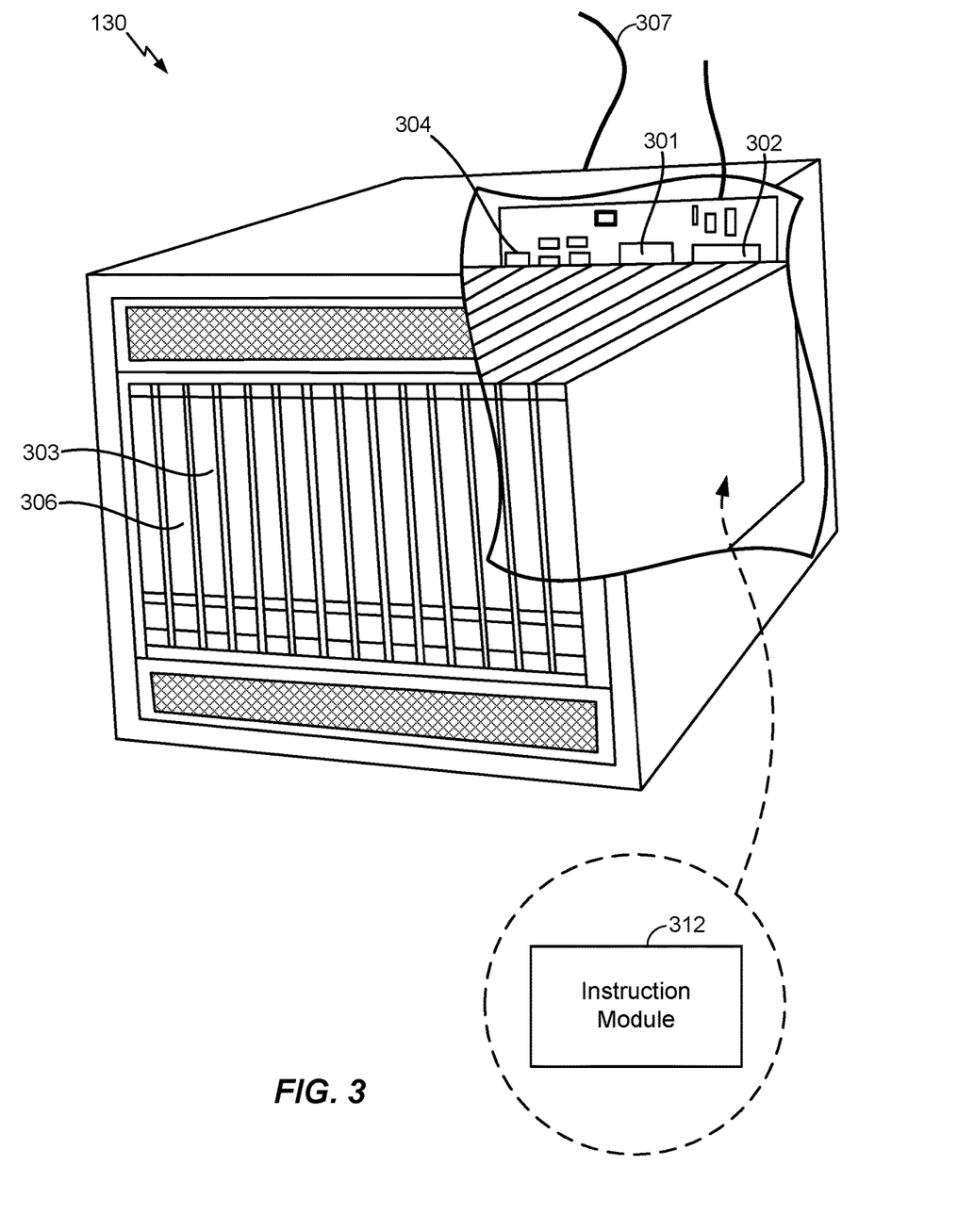
FIG. 3 illustrates an example of the supervisor device in accordance with aspects of the disclosure.

FIG. 3 illustrates an example of the supervisor device 130 in accordance with aspects of the disclosure. In an example, the supervisor device 130 includes a processor 301 coupled to volatile memory 302 and a large capacity nonvolatile memory 303 (e.g., a hard disk). The supervisor device 130 may also include a floppy disk drive, a compact disk (CD) drive, and/or a DVD disk drive 306 coupled to the processor 301. The supervisor device 130 may also include a communication device 304 (e.g., a transceiver, a transmit-receive unit, etc.) coupled to the processor 301 for establishing data connections with a network 307, such as the air interface 108, the Internet 175, or both. The supervisor device 130 may further include an instruction module 312 to cause the processor 301 and/or the communication device 304 to perform the supervisor device operations described herein. The processor 301 may load the instruction module 312 from the volatile memory 302 or the nonvolatile memory 303. Alternatively, the instruction module 312 may be a hardware or firmware component coupled to the processor 301 and/or the communication device 304.

Accordingly, an aspect of the disclosure can include a supervisor device (e.g., supervisor device 130) including the ability to perform functions described herein. As will be appreciated by those skilled in the art, the various logic elements can be embodied in discrete elements, software modules executed on a processor or any combination of software and hardware to achieve the functionality disclosed herein. For example, the processor 301, the volatile memory 302, the nonvolatile memory 303, the communication device 304, and/or the instruction module 312 may all be used cooperatively to load, store, and execute various functions disclosed herein and thus the logic to perform these functions may be distributed over various elements. Alternatively, the functionality could be incorporated into one discrete component. Therefore, the features of the supervisor device 130 in FIG. 3 are to be considered merely illustrative and the disclosure is not limited to the illustrated features or arrangement.

Figure 4:
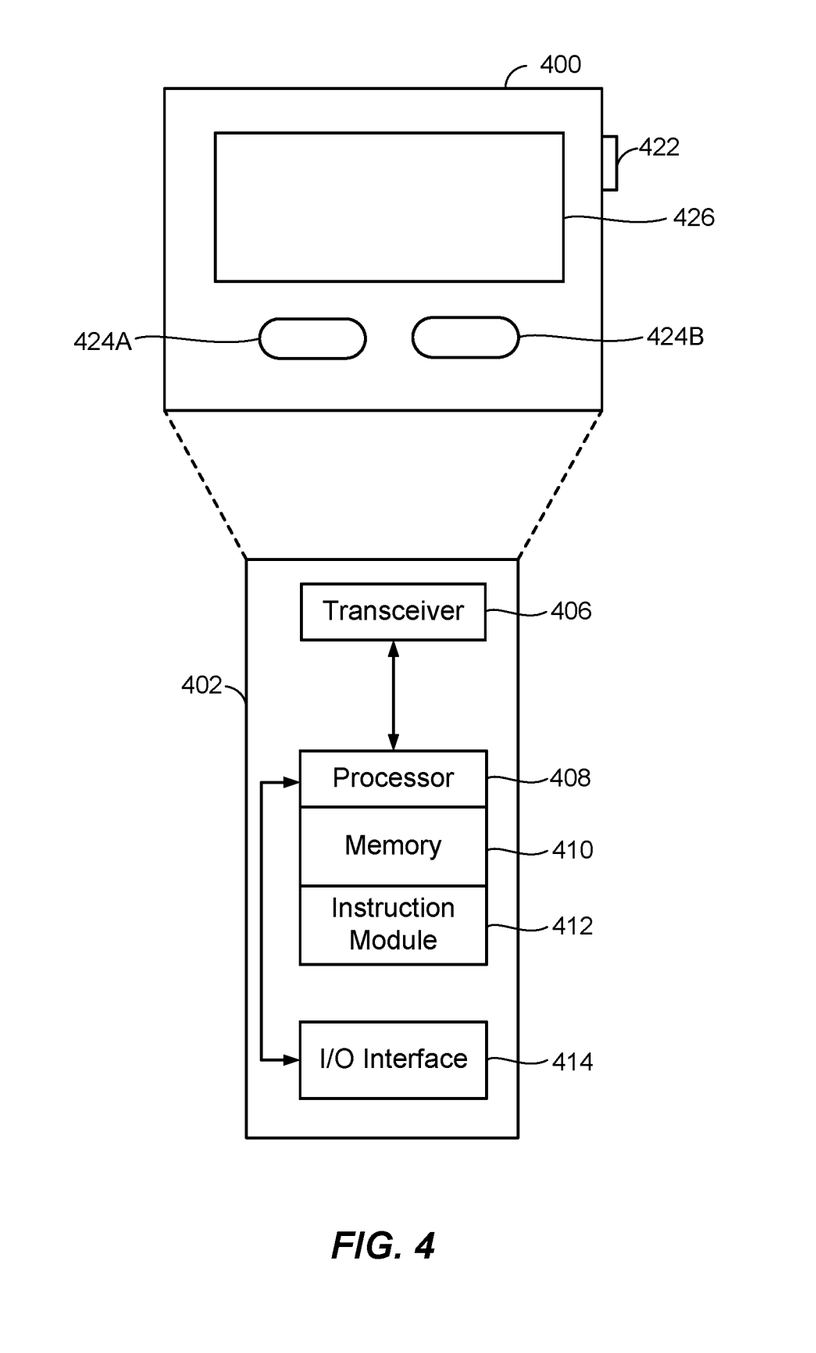
FIG. 4 illustrates an exemplary IoT device in accordance with aspects of the disclosure.

FIG. 4 illustrates a high-level example of an IoT device 400 in accordance with various aspects of the disclosure. The IoT device 400 may correspond to any of IoT devices 110-118 in FIG. 1. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIG. 1.

As shown in FIG. 4, in an example configuration for the IoT device 400, an external casing of IoT device 400 may be configured with a display 426, a power button 422, and two control buttons 424A and 424B, among other components, as is known in the art. The display 426 may be a touchscreen display, in which case the control buttons 424A and 424B may not be necessary. While not shown explicitly as part of IoT device 400, the IoT device 400 may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 400, can be embodied with different hardware configurations, a basic high-level configuration for internal hardware components is shown as platform 402 in FIG. 4. The platform 402 can receive and execute software applications, data and/or commands transmitted over a network interface, such as air interface 108 in FIG. 1 and/or a wired interface. The platform 402 can also independently execute locally stored applications. The platform 402 can include one or more transceivers 406 configured for wired and/or wireless communication (e.g., a Wi-Fi transceiver, a Bluetooth® transceiver, a cellular transceiver, a satellite transceiver, a GPS or SPS receiver, etc.) operably coupled to one or more processors 408, such as a microcontroller, microprocessor, application specific integrated circuit (ASIC), digital signal processor (DSP), programmable logic circuit, or other data processing device, which will be generally referred to as processor 408. The processor 408 can execute application programming instructions within a memory 410 of the IoT device 400.

The memory 410 can include one or more of ROM, RAM, EEPROM, flash cards, or any memory common to computer platforms. One or more input/output (I/O) interfaces 414 can be configured to allow the processor 408 to communicate with and control from various I/O devices such as the display 426, power button 422, control buttons 424A and 424B as illustrated, and any other devices, such as sensors, actuators, relays, valves, switches, and the like associated with the IoT device 400.

The IoT device 400 may further include an instruction module 412 to cause the processor 408 and/or the transceiver 406 to perform the IoT device operations described herein. The processor 408 may load the instruction module 412 from the memory 410. Alternatively, the instruction module 412 may be a hardware or firmware component coupled to the processor 408 and/or the transceiver 406.

Accordingly, various aspects can include an IoT device (e.g., IoT device 400) including the ability to perform the functions described herein. As will be appreciated by those skilled in the art, the various logic elements can be embodied in discrete elements, software modules executed on a processor (e.g., processor 408) or any combination of software and hardware to achieve functionality disclosed herein. For example, transceiver 406, processor 408, memory 410, instruction module 412, and I/O interface 414 may all be used cooperatively to load, store and execute the various functions disclosed herein and thus the logic to perform these functions may be distributed over various elements.

Alternatively, the functionality could be incorporated into one discrete component. Therefore, the features of the IoT device 400 in FIG. 4 are to be considered merely illustrative and the IoT device 400 is not limited to the illustrated features or arrangement shown in FIG. 4.

When a user receives an incoming call, for example, on the wireless mobile device 120, the user may miss the incoming call because the user did not hear the wireless mobile device 120 "ring" (e.g., due to ambient noise or because the user was not near the wireless mobile device 120), or the wireless mobile device 120 was set to "vibrate" or "silent mode." This is a very common problem and is undesirable to users, as a user may sometimes miss an important call.

In general, as noted above, IP based technologies and services have become more mature, driving down the cost and increasing availability of IP, which has allowed Internet connectivity to be added to more and more types of everyday devices. As such, the IoT is based on the idea that everyday electronic objects, not just computers and computer networks, can be readable, recognizable, locatable, addressable, and controllable via the Internet. In general, with the development and increasing prevalence of the IoT, numerous proximate heterogeneous IoT devices and other physical objects that have different types and perform different activities (e.g., lights, printers, refrigerators, air conditioners, etc.) may interact with one another in many different ways and be used in many different ways.

This connected nature of the IoT devices in a given area, such as a home or office, can be utilized to address the issue of notifying a user when he or she receives an incoming call or other notification. More specifically, upon detecting that the wireless mobile device 120, for example, is receiving an incoming call, the supervisor device 130 can instruct sound generating IoT devices, such as the television 110 and the washer and dryer 118, to reduce their noise levels. For example, the volume of the television 110 could be lowered and the operation of the washer and dryer 118 could be suspended. The supervisor device 130 may detect that the wireless mobile device 120 is receiving an incoming call/notification by intercepting messages (such as the incoming call announcement) sent over the air interface 108, for example, or the wireless mobile device 120 may notify the supervisor device 130 that it is receiving an incoming call/notification.

Additionally, many IoT devices have some form of display (e.g., display 426), so the supervisor device 130 may instruct such IoT devices of IoT devices 110-118 to display an alert message signaling that an incoming notification is pending for the user. Further, many IoT devices have some sort of speaker capability to provide audible notifications to the user. Such functionally can also be utilized to play an alert message signaling that an incoming notification is pending for the user.

Once the user accepts the incoming call, for example, the supervisor device 130 can instruct sound generating IoT devices, such as the television 110 and the washer and dryer 118, to reduce their noise levels (if they have not done so already) or to maintain the reduction in noise levels for the duration of the call. Similarly, if the supervisor device 130 detects that the user is attempting to make a call, it can instruct sound generating IoT devices, such as the television 110 and the washer and dryer 118, to reduce their noise levels. When the call is over, the supervisor device 130 can notify the sound-generating IoT devices that they can resume their previous sound level. Again, the supervisor device 130 may detect that the call has ended by intercepting messages (such as a call termination message) sent over the air interface 108, for example, or the wireless mobile device 120 may notify the supervisor device 130 that the call has ended.

Note that the location of the user may be beneficial in determining which IoT devices 110-118 should receive the above-described instructions. Specifically, it would be preferable for IoT devices near the user (e.g., in the same room or an adjacent room) to reduce their noise levels and to display or play alerts for the user. In that way, the user is more likely to receive the alert and to not be bothered by the noise of nearby IoT devices. Additionally, IoT devices that are not near the user will not be interrupted needlessly.

The supervisor device 130 may determine the location of the user in various ways. For example, users typically carry a personal cellular phone (e.g., a smartphone) around with them, so where the wireless mobile device 120 is a personal cellular phone, the supervisor device 130 can assume that the user is near the wireless mobile device 120. Similarly, if an IoT device in the wireless communications system 100 is a wearable IoT device, such as a smart watch, the supervisor device 130 can assume that the user is at the location of the wearable IoT device. As another example, if certain IoT devices are being operated or have recently been operated, such as the television 110 (e.g., it is on, has recently been turned on, or has recently been turned off), the refrigerator 116 (e.g., the door is open or has been recently opened), the washer and dryer 118 (e.g., they are being loaded or unloaded or were recently loaded or unloaded), the supervisor device 130 can assume that the user is near one of these IoT devices. As yet another example, the supervisor device 130 may be able to detect which lights are on in the user's house (where the user is at home), and thereby estimate where the user may be located. As will be appreciated, there may be other ways to determine the approximate location of the user.

Figure 5:
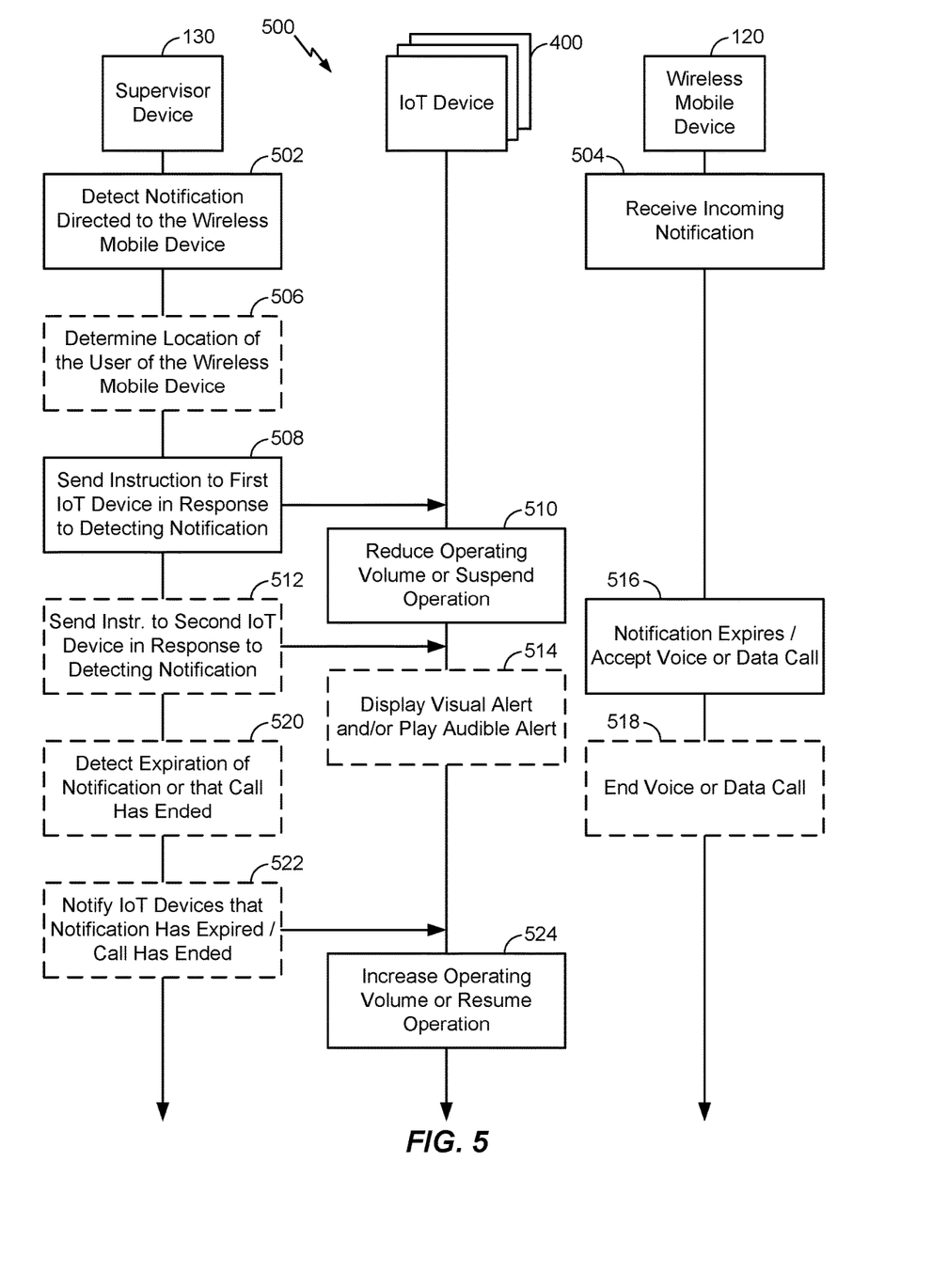
FIG. 5 illustrates an exemplary flow for providing notifications in a communication network of a plurality of IoT devices.

FIG. 5 illustrates an exemplary flow 500 for providing notifications in a communication network of a plurality of IoT devices 400. The operations described below as being performed by the supervisor device 130 may be performed by the communication device 304 as directed by the processor 301 (when the processor 301 executes the instruction module 312) and/or the instruction module 312 (when the instruction module 312 is a hardware component). The operations described below as being performed by the IoT device 400 may be performed by the transceiver 406 and/or the processor 408 as directed by the instruction module 412 (whether a software module or a hardware component).

At 502, the supervisor device 130 detects a notification directed to the wireless mobile device 120. The notification may be an incoming call announcement, an incoming short message service (SMS) message, or an incoming multimedia message service (MMS) message, for example. At 504, the wireless mobile device 120 receives the incoming notification. In an aspect, the supervisor device 130 can detect the notification by intercepting the notification as it is routed through the communication network (e.g., air interface 108) to the wireless mobile device 120. Alternatively, the supervisor device 130 can detect the notification by receiving a message from the wireless mobile device 120 indicating that the wireless mobile device 120 is receiving the notification.

At 506, the supervisor device 130 optionally determines, or attempts to determine, a location of a user of the wireless mobile device 120. At 508, the supervisor device 130 sends at least one instruction to at least a first IoT device 400 of the plurality of IoT devices 400 to reduce an operating volume or suspend operation of the first IoT device 400. Where the supervisor device 130 determines the location of the user of the wireless mobile device 120, the supervisor device 130 sends the at least one instruction to the first IoT device 400 based on the first IoT device 400 being within a threshold distance of the location of the user. If the supervisor device 130 did not attempt to determine the location of the user, or was not able to determine the location of the user, the supervisor device 130 may send the at least one instruction to each of the plurality of IoT devices 400 that make sufficient noise to interfere with the incoming notification (e.g., the television 110 and the washer and dryer 118).

In an aspect, the at least one instruction may be an instruction to reduce the operating volume or suspend the operation of the first IoT device 400 until the user of the wireless mobile device 120 has acknowledged the notification or the notification has expired (e.g., where the incoming notification is a call announcement that causes the wireless mobile device 120 to "ring"), in which case, the supervisor device 130 can notify the first IoT device 400 when that occurs, as at 522. In another aspect, where the incoming notification is a call announcement, the at least one instruction may be an instruction to reduce the operating volume or suspend the operation of the first IoT device 400 until the incoming call has ended (in which case, the supervisor device 130 can notify the first IoT device 400 when that occurs, as at 522).

At 510, the first IoT device 400 reduces its operating volume or suspends its operation based on the at least one instruction and the capabilities of the first IoT device 400. For example, where the first IoT device 400 corresponds to an IoT device with multiple volume levels, such as the television 110, the first IoT device may reduce its operating volume. As another example, where the first IoT device 400 corresponds to an IoT device that cannot control its operating volume, such as the washer and dryer 118, the first IoT device 400 may suspend its operation. Note that where the supervisor device 130 is aware of the capabilities of the plurality of IoT devices 400, the at least one instruction may specify which action (e.g., reduce volume or suspend operation) the first IoT device 400 should take, and the instruction 400 will be directed to the first IoT device 400 because the supervisor device 130 knows that it can take that action.

At 512, the supervisor device 130 optionally sends at least one instruction to at least a second IoT device 400 of the plurality of IoT devices 400 to display a visual alert corresponding to the notification on a display of the second IoT device 400. Additionally or alternatively, the at least one instruction to the second IoT device 400 may be an instruction to play an audible alert corresponding to the notification. At 514, the second IoT device 400 performs the instructed action. Operations 512 and 514 are optional because the supervisor device 130 may not instruct any IoT devices 400 to display a visual alert or play an audible alert. The visual and/or audible alert(s) may be displayed/played until the incoming notification expires (e.g., the wireless mobile device 120 stops "ringing" where the incoming notification is a call announcement) or the user accepts the incoming call (again, where the incoming notification is a call announcement), in which case, the supervisor device 130 can notify the second IoT device(s) when that occurs, as at 522. Alternatively, the visual and/or audible alert(s) may be displayed/played for a time period specified in the at least one instruction from the supervisor device 130.

The first and second IoT devices 400 may be the same or different devices. Thus, the first IoT device 400 may reduce its operating volume or suspend its operation, display a visual alert corresponding to the notification, play an audible alert corresponding to the notification, or any combination thereof. Alternatively, the first IoT device 400 may reduce its operating volume or suspend its operation and one or more second IoT devices 400 may display a visual alert corresponding to the notification, play an audible alert corresponding to the notification, or any combination thereof. Which IoT devices 400 perform which of these actions depends on the capabilities of the respective IoT devices and the estimated location of the user, i.e., whether or not the user is likely to see or hear the notifications from the particular IoT device(s) 400.

At 516, the incoming notification expires (e.g., the wireless mobile device 120 stops "ringing" where the incoming notification is a call announcement) or the user accepts the voice (e.g., cellular) or data (e.g., voice-over-IP (VoIP)) call. At 518, where the incoming notification was a call announcement and the user accepted the call, the call ends.

At 520, the supervisor device 130 detects that the incoming notification has expired or that the call has ended. The supervisor device 130 may detect that the incoming notification has expired based on detecting that incoming notification messages are no longer being transmitted to the wireless mobile device 120. The supervisor device 130 may detect that the call has ended based on a call termination message sent over the communication network. Alternatively, the wireless mobile device 120 may send a notification to the supervisor device 130 indicating that the notification has expired or that the call has ended.

At 522, upon detecting that the incoming notification has expired or that the call has ended, the supervisor device 130 optionally notifies the first and second IoT devices 400 of the same. Operations 520 and 522 are optional because the supervisor device 130 may have set a time period for the first and second IoT devices 400 to reduce their volume, suspend their operation, display a visual alert, or play an audible alert. At 524, the first IoT device 400 increases its operating volume or resumes operation. If any IoT devices 400 were instructed to display a visual alert and/or play an audible alert, those devices can cease such alert(s).

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects of the disclosure, those skilled in the art will appreciate that various changes and modifications could be made herein without departing from the scope of the disclosure as defined by the appended claims. The functions, operations, and/or actions of the method claims in accordance with the aspects described herein need not be performed in any particular order. Furthermore, although elements may be described above or claimed in the singular, the plural is contemplated unless limitation to the singular is explicitly stated.

What is claimed is:

1. A method of providing notifications in a communication network of a plurality of Internet of Things (IoT) devices, comprising:
    detecting, at a supervisor device in the communication network, a notification directed to a wireless mobile device in the communication network;
    determining, by the supervisor device, a location of a user of the wireless mobile device; and
    sending, by the supervisor device, at least one instruction to at least a first IoT device of the plurality of IoT devices to reduce an operating volume or suspend operation of the first IoT device, wherein the supervisor device sends the at least one instruction to the first IoT device based on the first IoT device being within a threshold distance of the location of the user of the wireless mobile device.

2. The method of claim 1, wherein the at least one instruction to reduce the operating volume or suspend the operation of the first IoT device comprises at least one instruction to reduce the operating volume or suspend the operation of the first IoT device until a user of the wireless mobile device has acknowledged the notification or the notification has expired.

3. The method of claim 1, further comprising:
    sending, by the supervisor device, at least one instruction to at least a second IoT device of the plurality of IoT devices to display a visual alert corresponding to the notification on a display of the second IoT device.

4. The method of claim 3, wherein the second IoT device is the first IoT device.

5. The method of claim 1, further comprising:
    sending, by the supervisor device, at least one instruction to at least a second IoT device of the plurality of IoT devices to play an audible alert corresponding to the notification.

6. The method of claim 1, wherein the notification comprises an announcement of an incoming call, an incoming short message service (SMS) message, or an incoming multimedia message service (MMS) message.

7. The method of claim 6, wherein the at least one instruction to reduce the operating volume or suspend the operation of the first IoT device comprises at least one instruction to reduce the operating volume or suspend the operation of the first IoT device until the incoming call has ended.

8. The method of claim 7, further comprising:
    sending, by the supervisor device, at least one instruction to the first IoT device indicating that the incoming call has ended.

9. The method of claim 1, wherein the detecting comprises intercepting the notification as it is routed through the communication network to the wireless mobile device.

10. The method of claim 1, wherein the detecting comprises receiving a message from the wireless mobile device indicating that the wireless mobile device is receiving the notification.

11. The method of claim 1, wherein the first IoT device being within the threshold distance of the user comprises the first IoT device being within a same room as the user or an adjacent room to the user.

12. The method of claim 1, wherein the supervisor device determines the location of the user based on a location of the wireless mobile device or a wearable IoT device of the plurality of IoT devices.

13. The method of claim 1, wherein the supervisor device determines the location of the user as a location of the first IoT device based on the first IoT device being currently operated or as a location of a second IoT device of the plurality of IoT devices based on the second IoT device having been previously operated within a threshold time period.

14. A method of receiving notifications in a communication network of a plurality of Internet of Things (IoT) devices, comprising:
    receiving, at an IoT device of the plurality of IoT devices, at least one instruction from a supervisor device in the communication network to reduce an operating volume or suspend operation of the IoT device based on detection of a notification directed to a wireless mobile device in the communication network, wherein the IoT device receives the at least one instruction based on the IoT device being within a threshold distance of a location of a user of the wireless mobile device; and
    reducing, by the IoT device, the operating volume of the IoT device or suspending, by the IoT device, the operation of the IoT device in response to the at least one instruction.

15. The method of claim 14, wherein the at least one instruction to reduce the operating volume or suspend the operation of the IoT device comprises at least one instruction to reduce the operating volume or suspend the operation of the IoT device until a user of the wireless mobile device has acknowledged the notification or the notification has expired.

16. The method of claim 14, further comprising:
    receiving, at the IoT device, at least one instruction from the supervisor device to display a visual alert corresponding to the notification on a display of the IoT device.

17. The method of claim 14, further comprising:
    receiving, at the IoT device, at least one instruction from the supervisor device to play an audible alert corresponding to the notification.

18. The method of claim 14, wherein the notification comprises an announcement of an incoming call, an incoming short message service (SMS) message, or an incoming multimedia message service (MMS) message.

19. The method of claim 18, wherein the at least one instruction to reduce the operating volume or suspend the operation of the IoT device comprises at least one instruction to reduce the operating volume or suspend the operation of the IoT device until the incoming call has ended.

20. The method of claim 19, further comprising:
    receiving, at the IoT device, at least one instruction from the supervisor device indicating that the incoming call has ended.

21. The method of claim 20, further comprising:
    increasing, by the IoT device, the operating volume of the IoT device or resuming, by the IoT device, the operation of the IoT device.

22. The method of claim 14, wherein the IoT device being within the threshold distance of the user comprises the IoT device being within a same room as the user or an adjacent room to the user.

23. An apparatus for providing notifications in a communication network of a plurality of Internet of Things (IoT) devices, comprising:
    a transceiver of a supervisor device; and
    at least one processor of the supervisor device configured to:
        cause the transceiver to detect a notification directed to a wireless mobile device in the communication network;
        determine a location of a user of the wireless mobile device; and
        cause the transceiver to send at least one instruction to at least a first IoT device of the plurality of IoT devices to reduce an operating volume or suspend operation of the first IoT device based on the first IoT device being within a threshold distance of the location of the user of the wireless mobile device.

24. The apparatus of claim 23, wherein the at least one instruction to reduce the operating volume or suspend the operation of the first IoT device comprises at least one instruction to reduce the operating volume or suspend the operation of the first IoT device until a user of the wireless mobile device has acknowledged the notification or the notification has expired.

25. The apparatus of claim 23, wherein the at least one processor is further configured to cause the transceiver to:
    send at least one instruction to at least a second IoT device of the plurality of IoT devices to display a visual alert corresponding to the notification on a display of the second IoT device.

26. The apparatus of claim 25, wherein the second IoT device is the first IoT device.

27. The apparatus of claim 23, wherein the at least one processor is further configured to cause the transceiver to:
    send at least one instruction to at least a second IoT device of the plurality of IoT devices to play an audible alert corresponding to the notification.

28. The apparatus of claim 23, wherein the notification comprises an announcement of an incoming call, an incoming short message service (SMS) message, or an incoming multimedia message service (MMS) message.

29. The apparatus of claim 28, wherein the at least one instruction to reduce the operating volume or suspend the operation of the first IoT device comprises at least one instruction to reduce the operating volume or suspend the operation of the first IoT device until the incoming call has ended.

30. The apparatus of claim 29, wherein the at least one processor is further configured to cause the transceiver to:
    send at least one instruction to the first IoT device indicating that the incoming call has ended.

31. The apparatus of claim 23, wherein the at least one processor being configured to cause the transceiver to detect comprises the at least one processor being configured to cause the transceiver to intercept the notification as it is routed through the communication network to the wireless mobile device.

32. The apparatus of claim 23, wherein the at least one processor being configured to cause the transceiver to detect comprises the at least one processor being configured to cause the transceiver to receive a message from the wireless mobile device indicating that the wireless mobile device is receiving the notification.

33. The apparatus of claim 23, wherein the first IoT device being within the threshold distance of the user comprises the first IoT device being within a same room as the user or an adjacent room to the user.

34. The apparatus of claim 23, wherein the at least one processor determines the location of the user based on a location of the wireless mobile device or a wearable IoT device of the plurality of IoT devices.

35. The apparatus of claim 23, wherein the at least one processor determines the location of the user as a location of the first IoT device based on the first IoT device being currently operated or as a location of a second IoT device of the plurality of IoT devices based on the second IoT device having been previously operated within a threshold time period.

36. An apparatus for receiving notifications in a communication network of a plurality of Internet of Things (IoT) devices, comprising:
a transceiver of an IoT device of the plurality of IoT devices configured to receive at least one instruction from a supervisor device in the communication network to reduce an operating volume or suspend operation of the IoT device based on detection of a notification directed to a wireless mobile device in the communication network, wherein the transceiver receives the at least one instruction based on the IoT device being within a threshold distance of a location of a user of the wireless mobile device; and
at least one processor of the IoT device configured to reduce the operating volume of the IoT device or suspend the operation of the IoT device in response to the at least one instruction.

37. The apparatus of claim 36, wherein the at least one instruction to reduce the operating volume or suspend the operation of the IoT device comprises at least one instruction to reduce the operating volume or suspend the operation of the IoT device until a user of the wireless mobile device has acknowledged the notification or the notification has expired.

38. The apparatus of claim 36, wherein the transceiver is further configured to:
receive at least one instruction from the supervisor device to display a visual alert corresponding to the notification on a display of the IoT device.

39. The apparatus of claim 36, wherein the transceiver is further configured to:
receive at least one instruction from the supervisor device to play an audible alert corresponding to the notification.

40. The apparatus of claim 36, wherein the notification comprises an announcement of an incoming call, an incoming short message service (SMS) message, or an incoming multimedia message service (MMS) message.

41. The apparatus of claim 40, wherein the at least one instruction to reduce the operating volume or suspend the operation of the IoT device comprises at least one instruction to reduce the operating volume or suspend the operation of the IoT device until the incoming call has ended.

42. The apparatus of claim 41, wherein the transceiver is further configured to:
receive at least one instruction from the supervisor device indicating that the incoming call has ended.

43. The apparatus of claim 42, wherein the at least one processor is further configured to:
increase the operating volume of the IoT device or resuming, by the IoT device, the operation of the IoT device.

44. The apparatus of claim 36, wherein the IoT device being within the threshold distance of the user comprises the IoT device being within a same room as the user or an adjacent room to the user.

45. An apparatus for providing notifications in a communication network of a plurality of Internet of Things (IoT) devices, comprising:
means for detecting, at a supervisor device in the communication network, a notification directed to a wireless mobile device in the communication network;
means for determining, by the supervisor device, a location of a user of the wireless mobile device; and
means for sending, by the supervisor device, at least one instruction to at least a first IoT device of the plurality of IoT devices to reduce an operating volume or suspend operation of the first IoT device, wherein the supervisor device sends the at least one instruction to the first IoT device based on the first IoT device being within a threshold distance of the location of the user of the wireless mobile device.

46. An apparatus for receiving notifications in a communication network of a plurality of Internet of Things (IoT) devices, comprising:
means for receiving, at an IoT device of the plurality of IoT devices, at least one instruction from a supervisor device in the communication network to reduce an operating volume or suspend operation of the IoT device based on detection of a notification directed to a wireless mobile device in the communication network, wherein the IoT device receives the at least one instruction based on the IoT device being within a threshold distance of a location of a user of the wireless mobile device; and
means for reducing, by the IoT device, the operating volume of the IoT device or for suspending, by the IoT device, the operation of the IoT device in response to the at least one instruction.

47. A non-transitory computer-readable medium for providing notifications in a communication network of a plurality of Internet of Things (IoT) devices, comprising:
at least one instruction instructing a supervisor device in the communication network to detect a notification directed to a wireless mobile device in the communication network;
at least one instruction instructing the supervisory device to determine a location of a user of the wireless mobile device; and
at least one instruction instructing the supervisor device to send at least one instruction to at least a first IoT device of the plurality of IoT devices to reduce an operating volume or suspend operation of the first IoT device, wherein the supervisor device sends the at least one instruction to the first IoT device based on the first IoT device being within a threshold distance of the location of the user of the wireless mobile device.

48. A non-transitory computer-readable medium for receiving notifications in a communication network of a plurality of Internet of Things (IoT) devices, comprising:
at least one instruction instructing an IoT device of the plurality of IoT devices to receive at least one instruction from a supervisor device in the communication network to reduce an operating volume or suspend operation of the IoT device based on detection of a notification directed to a wireless mobile device in the communication network, wherein the IoT device receives the at least one instruction based on the IoT device being within a threshold distance of a location of a user of the wireless mobile device; and
at least one instruction instructing the IoT device to reduce the operating volume of the IoT device or suspend the operation of the IoT device in response to the at least one instruction.

\* \* \* \* \*